United States Patent [19]

Cordia et al.

[11] Patent Number: 4,944,987
[45] Date of Patent: Jul. 31, 1990

[54] HEAT RECOVERABLE ARTICLES

[75] Inventors: Johannes M. Cordia, Pellenberg, Belgium; Roger W. Evans, Chiseldon, England; Robert H. Van Loo, Linden, Belgium

[73] Assignee: N. V. Raychem S. A., Belgium

[21] Appl. No.: 314,324

[22] Filed: Feb. 22, 1989

Related U.S. Application Data

[63] Continuation of Ser. No. 203,507, May 25, 1988, abandoned, which is a continuation of Ser. No. 45,267, Apr. 22, 1987, abandoned, which is a continuation of Ser. No. 858,541, Apr. 29, 1986, abandoned, which is a continuation of Ser. No. 720,214, Apr. 5, 1985, abandoned.

[30] Foreign Application Priority Data

| Apr. 6, 1984 | [GB] | United Kingdom | 8408908 |
| Apr. 6, 1984 | [GB] | United Kingdom | 8408907 |
| Nov. 28, 1984 | [GB] | United Kingdom | 8430088 |

[51] Int. Cl.$^5$ .............................................. H05B 3/10
[52] U.S. Cl. ..................... 428/192; 138/156; 174/DIG. 8; 219/535; 219/549; 428/35.1; 428/34.9; 428/225; 428/226; 428/245; 428/293; 428/343
[58] Field of Search ............... 174/DIG. 8, DIG. 11; 428/34.9, 35.1, 192, 225, 226, 245, 293, 343, 379; 138/99, 156, 167, 169; 219/213, 535, 549; 156/53, 84, 86

[56] References Cited

U.S. PATENT DOCUMENTS

| 3,467,761 | 9/1969 | Plummer | 174/68 |
| 4,323,607 | 4/1982 | Nishimura et al. | 219/213 |
| 4,369,356 | 1/1983 | Tsurutani et al. | 174/DIG. 8 |
| 4,384,906 | 5/1983 | Molinari et al. | 174/92 |
| 4,412,125 | 10/1983 | Nagasawa et al. | 219/549 |
| 4,472,222 | 9/1984 | Moisson et al. | 174/92 |
| 4,675,512 | 9/1987 | Doucet et al. | 174/92 |

FOREIGN PATENT DOCUMENTS

| 5048279 | 8/1979 | Australia . |
| 6131980 | 8/1980 | Australia . |
| 6946081 | 4/1981 | Australia . |
| 7757981 | 11/1981 | Australia . |
| 1018276 | 9/1982 | Australia . |
| 705309 | 3/1965 | Canada . |
| 0008912 | 3/1980 | European Pat. Off. . |
| 0024179 | 2/1981 | European Pat. Off. . |
| 0052476 | 5/1982 | European Pat. Off. . |
| 0058045 | 8/1982 | European Pat. Off. . |
| 0096124 | 12/1983 | European Pat. Off. . |
| 0115905 | 8/1984 | European Pat. Off. . |
| 7757271 | 5/1977 | Japan . |
| 1155470 | 6/1969 | United Kingdom . |
| 1223967 | 3/1971 | United Kingdom . |
| 2057788 | 4/1981 | United Kingdom . |
| 2083859 | 3/1982 | United Kingdom . |
| 2133639 | 1/1984 | United Kingdom . |
| 2129332 | 5/1984 | United Kingdom . |
| 2135139 | 8/1984 | United Kingdom . |

OTHER PUBLICATIONS

"Welded Polyethylene Splice Closures A Reliable Alternative", by D. F. Gill, Dec. 1983.

*Primary Examiner*—James Seidleck
*Attorney, Agent, or Firm*—Herbert Burkard; Edith A. Rice

[57] ABSTRACT

The invention relates to a heat-recoverable covers which comprises embedded electrical resistance heaters, and to methods of covering an elongate object using such covers.

In a preferred embodiment, the cover comprises a heat-recoverable polymeric sheet (22) or fabric, provided with upstanding rails (24,25) as a first closure means. A heating element (36) is embedded in the sheet, and arranged to follow a serpentine path such that each return loop portion 38 projects beyond the edges of the cover. The sheet is coated on its inner surface with a layer of adhesive and/or sealant (28,30).

In use, the cover is wrapped around a substrate (32) at least once, and first and second closure means (24,25 and 26,27) are engaged to hold the cover in the wrapped configuration. The cover is then heated to cause the cover to recover, and the adhesive and/or sealant to form a seal.

18 Claims, 3 Drawing Sheets

HEAT RECOVERABLE ARTICLES

This application is a continuation of application Ser. No. 07/203,507, filed Mar. 25, 1988, now abandoned, which application is a continuation of application Ser. No. 045,267, filed Apr. 22, 1987 now abandoned, which application is a continuation of application Ser. No. 858,541, filed 4/29/86 now abandoned, which application is a continuation of application Ser. No. 720,214, filed 4/5/85 now abandoned.

DESCRIPTION

The present invention relates to heat recoverable articles which comprise electrical resistance heaters, and to methods of recovering heat recoverable articles by electrical resistance heating.

A heat recoverable article is one whose dimensional configuration may be made to change when subjected to an appropriate treatment.

Usually these articles recover, on heating, towards an original shape from which they have previously been deformed but the term "heat-recoverable", as used herein, also includes an article which, on heating, adopts a new configuration, even if it has not been previously deformed.

In their most common form, heat-recoverable articles comprise a heat-shrinkable sleeve made from a polymeric material exhibiting the property of elastic or plastic memory as described, for example, in U.S. Pat. Nos. 2,027,962, 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric article into the desired heat-unstable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Patent No. 1,440,524, an elastomeric member such as an outer tubular member is held in a stretched state by a second member, such as an inner tubular member, which, upon heating weakens and thus allows the elastomer member to recover.

Heat recoverable articles find many applications, for example in sealing and corrosion protection of pipelines or cables or joints thereof.

Recently a number of heat-recoverable articles which are based on fabrics have been devised, and are the subject of copending U.K. Patent Application Publications Nos. 2133639, 2133740, 2134334, 2135632, 2135836, 2139142.

The most common method of heating heat-recoverable articles is by means of an open flame, provided for example by a propane torch. A propane torch has the advantage of being easily portable and of providing the correct temperature for the large sleeves most commonly used. However uniform heat application in confined spaces is difficult using a propane torch, and further the use of a torch is often prohibited where flammable materials are present, for example where a heat recoverable article is to be used to seal a leaking gas pipeline.

Electrical heating systems are also known. For example, European Patent No. 8,912 (UBE Industries/Furukawa Electric Co.) discloses a synthetic resin cover containing an electric heating member. The heating member is made of a metal wire conductor which is arranged in a zig-zag pattern across the cover and is completely embedded in the cover.

This cover is disclosed as being suitable for covering pipe joints having a relatively smooth profile, but it cannot be used to cover large transitions, for example bell and spigot joints, because of its limited recovery ratio. It is believed that this low recovery ratio may be due, at least in part, to the configuration of the metal wire conductor, which, being itself nonrecoverable, substantially impedes recovery of the cover at its edge regions.

Furthermore, such a cover is insufficiently strong to resist large internal pressures, and the large pressures exerted, for example at a badly leaking gas main joint, may, in some circumstances cause ballooning of the sleeve.

There are instances where the substrate to be environmentally sealed has no accessable end (for example a cable or pipe which cannot conveniently be severed) or where the substrate is situated in a confined space (such as a man-hole). In such cases a tubular article cannot conveniently be slid over an end of the substrate, and to overcome the problem, wraparound articles have been developed. A wraparound article is simply an article which can be wrapped around a substrate with no free end and then secured in the wrapped-around configuration. The wraparound articles may be provided with closure members adjacent opposing edges, which interlock or which are held together by a further member, or the wrapped sleeve may be secured in the wrapped configuration by, for example an adhesive coated patch closure.

In some applications it is desirable to use a thick and hence strong cover, for example where the wraparound cover is to be subjected to internal pressure, for example in the case of a splice closure for a pressurised telecommunications cable or in the case of a cover for a leaking fluid-carrying pipe or a joint between two such pipes. In such applications it is necessary to retain the pressure and this is typically done by choosing a cover material of increased strength, by providing a reinforcing liner, or by increasing the thickness of the cover, or by a combination of these methods. Another situation where a thick cover is preferred is where the object to be covered is large, because of the large hoop stresses which remain in a large sleeve having some unresolved recovery.

The present invention provides a cover that inter alia avoids the problems of the known covers and furthermore provides an electrically heatable cover which is capable of high recoverable ratios, and which can provide a thick covering around an object, for use for example in pressurised applications.

Accordingly, the present invention provides a heat-recoverable cover comprising a polymeric material, or fabric which has recoverable cross-linked fibres arranged in its warp or its weft so that it is recoverable in substantially one direction, and an electrical resistance heating element in thermal contact with the cover, which heating element is arranged to pass back and forth along, or generally parallel to, the surface of the cover in a serpentine path; with the proviso that, where the cover comprises polymeric material, either at least one return loop portion formed by the heating element projects beyond the end of the cover; or, the cover comprises two closure means spaced apart to define a first cover portion between them, which first cover portion can be wrapped once around an object to be covered, and secured in the wrapped configuration by the closure means, at least one of the closure means being spaced from a free end of the cover to define one or more second cover portions that together can be wrapped, at least once around the object; or both.

The resistance heating element may conveniently be powered by connecting the element to a power source. Preferably, the loop portions of the serpentine-like element project beyond the edges of the cover, interalia to provide a convenient point of attachment for the power source.

In a preferred embodiment the heating element is divided into modules which are powered in parallel. The size of each module and the wire resistivity may advantageously be arranged such that the desired predetermined heat flux is attained. This embodiment advantageously enables a single voltage to be used for a range of sizes and shape of cover simply by selection of the size of each heating section and the wire resistivity. This advantageously allows the use of a single power source and prevents over or under heating by operator error. It is particularly advantageous that the return loop portions provide a convenient point of attachment where modular heating, and hence several points of attachment are required. Alternatively, to ensure uniform heating around the circumference of the substrate, the modules may be connected to a power source via a switching device which allows each module to recover partially, sequentially in turn. The recovery of the cover around the substrate will thus be more uniform than would be the case if one module were heated to cause full recovery, before another module was heated. Furthermore, the power requirement to effect recovery via a switching device is much less than would be the case if all the modules were connected and powered simultaneously. The heater modules may be separately connected portions of the heater element of a large tubular or wraparound sleeve, or may be respective heater elements of two or more wraparound sleeves joined end to end to form a large sleeve. Suitable switching devices will be apparent to those skilled in the art.

In a preferred embodiment the cover is recoverable, preferably shrinkable, in substantially a single direction and the heating element is arranged to pass along a serpentine path back and forth across the single direction. The serpentine path is advantageous since it ensures that adjacent lengths of the element are connected so as to provide a continuous current path. Preferably the element passes back and forth, substantially perpendicular to the single recovery direction so as not to impede recovery of the cover. Where the heating element passes across the single direction, it is particularly advantageous that the return loops project beyond the edges of the cover. This is because the parts of the heating element that extend generally parallel to the direction of the recovery of the cover, which could hinder recovery, lie outside the cover. Thus, for example, as a shrinkable cover is made to shrink, adjacent lengths of the heating element, passing back and forth across the single direction of recovery, may move towards each other, and each return loop, projecting beyond the edge of the cover, may adopt a generally mushroom shape at its end in order to accommodate the reduction in size of the cover. It is particularly preferred, in order to accommodate high shrinkage of the cover, that the connecting return loop between any two adjacent lengths of the heating element projects beyond the edge of the cover a distance which is at least one quarter, preferably one half, and more preferably equal to, the distance of the spacing between the said two lengths of the heating element.

While a serpentine-like element is preferred, it is also envisaged that in some circumstances, it may be appropriate to use another configuration of heating element, for example one which comprises a plurality of heater portions extending in a generally parallel fashion across the cover connected in a parallel along an edge of the sheet.

The mushrooming effect of the return loops advantageously enables large shape changes of the cover to be accommodated. In a preferred embodiment the cover is arranged to recover by a recovery ratio of at least 2:1, more preferably by a recovery ratio of at least 3:1, and especially preferably by a recovery ratio of at least 4:1. The recovery ratio of an article is the ratio of the unrecovered size to the freely fully recovered size of the article. For a tubular article recovering radially the recovery ratio is the ratio of the unrecovered diameter to the freely fully recovered diameter. Such large recovery ratios would not be possible if the loops did not project beyond the cover edges. Furthermore the mushrooming effect ensures that recovery of the cover edges is not hindered. This is advantageous since it ensures that the edges of the cover lie flush with the covered substrate and avoids the formation of upstanding flanges at the cover edges, which could, in certain applications, be disadvantageously subject to peel stresses.

In a preferred embodiment, the cover comprises a fabric, which itself comprises recoverable, preferably cross-linked, fibres arranged in one of the warp or the weft of the fabric, so that the fabric is recoverable in substantially one direction. The heating element is arranged such that lengths thereof extend in a direction substantially perpendicular to the recovery direction of the fabric so that they do not impede the recovery thereof, and preferably, such that adjacent lengths of the heating element are electrically connected to provide a continuous current path.

The term "fibre" as used herein includes filaments e.g. monofilaments or multifilaments, and also staple fibres, and tapes. The fabrics used in the articles according to the invention preferably employ the heat-shrinkable fibres in the form of filaments, especially monofilaments. In another preferred embodiment the recoverability is highest, especially preferably significantly highest, in the direction of the recoverable fibres.

Cross-linking of the fibres enables the fabric to be heated above their recovery temperature without melting. Higher recovery ratios can be achieved with crosslinked fibres than would be possible with noncrosslinked stretched fibres, and in addition fabric containing cross fibres is not so sensitive to overheating.

Any of the fabrics described in U.K. Patent Application Publication Nos. 2133639, 2133740, 2134334, 2135632, 2135836 and 2139142 can be used in the article and method of the present invention.

In a preferred embodiment the recovery of the fabric in the direction of the fibres is significantly greater than the recovery in the direction of the heating element lengths.

Whilst the fabric may be used alone, it is often advantage for it to be employed in conjunction with an adhesive or sealant or other polymeric material that renders it substantially impervious to fluids, the adhesive, sealant or other material either being applied in situ when the fabric is installed or applied in the factory. Thus, for example, the fabric may be impregnated with a curable adhesive composition, e.g. a curable epoxy composition and especially an optionally b-staged epoxy resin that is cured by means of a polyamide, an anhydride or an isocyanate although other materials may be used such as phenolic resins or isocyanate/phenolic resin. The resin may alternatively be laminated on to the fabric or it may be employed in particulate form as described in U.K. Patent Publication No. 2104800. Alternatively an adhesive such as a hot-melt adhesive and especially an adhesive based on a polyamide or an ethylene-vinyl acetate copolymer may be applied either to the fabric or to the substrate during installation.

Most preferably, however, the heat-recoverable fabric is used in combination with a matrix polymer layer which softens when heated to accommodate recovery of the fabric, to form a single composite structure.

The heat-recoverable fabric is preferably bonded to, more preferably embedded in, the polymer matrix material. At or above the recovery temperature of the fibres, the polymer matrix material should be capable of limited flow under pressure so that it retains the integrity of the composite structure without substantially impeding recovery of the fibres. It preferably has, at the aforesaid temperature, an elongation to break of greater than 50%, most preferably greater than 100%, and a 20% secant modulus of preferably greater than 100%, and a 20% secant modulus of preferably at least $5 \times 10^{-2}$ MPa, most preferably at least $10^{-1}$ MPa, measured at a strain rate of 300%M per minute.

The ability of the matrix material to flow when heated need not necessarily apply after recovery. Thus, for example, the polymer matrix material may eventually cure to a thermoset on heating, although it is preferred that the cure rate is sufficiently slow under the recovery conditions not to affect adversely the above mentioned physical properties of the polymer matrix material during the recovery of the fibres. Thus, for example, the polymer forming the matrix material may contain grafted hydrolysable silane groups which are capable of cross-linking the material subsequently in the presence of moisture. Alternatively the matrix material may include a polymer, preferably a rubber and especially an acrylic rubber, which contains epoxy groups and a room temperature insoluble curing agent e.g. dicyandiamide. Preferred matrix materials are described in U.K. Patent Application Publication No. 2135632.

We have found that a heat recoverable fabric cover incorporating a heating element can be surprisingly more split resistant than a corresponding prior art, polymeric sheet article. The split resistance is particularly improved when the fabric is employed in conjunction with an adhesive or sealant or other polymeric material, and is especially preferably improved when the fabric is used in combination with a matrix polymer layer. Without limiting the invention in any way, it is thought that this latter improvement may be due to the adhesive, sealant, other polymer layer or the polymer matrix absorbing stresses in the recovering part.

The fabric can be knitted, woven, non-woven, braided, or the like. It is preferred that the fabric is a woven fabric. The fabric can be woven in any suitable pattern, for example, twill, broken twill, satin, sateen, Leno, plain, hop sack, sack and various weave combinations, in single or multiple ply weaves for example two or three ply weaves. The fabric may be knitted if desired, either warp knitted or weft knitted. Where the fabric is a braid the terms "warp" and "weft" are not strictly applicable, but when used in this Specification they can be considered to relate to braids by arbitary selection of fibre directions.

The fabric may contain only heat-recoverable fibres, or as is preferred it may contain both heat-recoverable fibres and non heat-recoverable fibres. The fibres may be arranged in any pattern in accordance with the invention, but it is especially preferred that all the fibres extending in the direction of the recoverable fibres are recoverable, and that all the other fibres are non-heat-recoverable. Where the fabric is woven it preferably has heat-recoverable fibres in one direction and dimensionally heat stable fibres in the other direction so that the fabric as a whole is recoverable in a single direction only. Where the fabric is knitted, if the fabric is made solely from heat-fibres it will be recoverable in two dimensions, but if, as is preferred it is knitted from a heat-stable fibre and a heat-recoverable fibre that is either warp or weft inserted, it will be recoverable in only one direction.

The recoverable fibres preferably form part of the fabric itself. The recoverable fibres may instead be additional, and be incorporated, for example, inserted after production of the basic fabric.

The fibres are preferably formed from a polymeric heat-recoverable material which recover when heated to over and above their recovery temperature. By "the recovery temperature" of polymeric heat-recoverable materials is meant that temperature at which the recovery of the polymeric material will go substantially to completion. In general, the recovery temperature will be the crystalline melting transition temperature if the polymer is crystalline or the glass transition temperature if the polymer is amorphous.

The heat-recoverable fibres are preferably formed from a polymeric material that imparts good physical properties and, in particular, good creep resistance to the fibres. Olefin polymers such as polyethylene and ethylene copolymers, polyamides, polyesters, acrylic polymers and other polymers may be employed and preferably those that are capable of being cross-linked. A particularly preferred polymeric material for the fibres is based on polyethylene having a density of from 0.94 to 0.97/gms/cc, a weight average molecular weight Mw of from $80 \times 10^3$ to $200 \times 10^3$ and a number average molecular weight Mn of from $15 \times 10^3$ to $30 \times 10^3$.

Preferably the recovery temperature of the fibres is 60° C. or more, most preferably from 80° C. to 250° C. such as, for example, 120° to 150° C.

Any suitable material may be used for any non heat-fibres included in the fabric. As examples there may be mentioned glass fibre, polyester, Rayon (Trade Mark), cotton and tinsel metal.

The spacing of the recoverable fibres which extend in one of the warp or weft direction is preferably sig-smaller than the spacing of the fibres that extend across the recoverable fibres in the other of the warp or the weft direction. Thus the density of recoverable fibres is preferably significantly higher. The packing density of the fabric is generally expressed in terms of fibre-ends/distance. The density of the recoverable fibres is preferably in the range 60 to 120 fibre-ends/inch, and is especially preferably about 90 fibre-ends/inch. The density of the fibres extending across the recoverable fibre is preferably in the range 1 to 10 fibre-ends/inch. If the density of the fibres extending across the recoverable fibres is too low the fabric cannot retain its shape, and if the density of those fibres is too high, recovery may be hindered.

The recoverable fibres are preferably arranged to give a recovery ratio of the cover of at least 2:1, preferably at least 3:1, more preferably at least 4:1. Such high recovery ratios are particularly advantageous for covering elongate objects which vary significantly in cross-section along their length and have a sharp transition zone, for example a bell and spigot joint between metal pipes.

A single heating element may be used in the present sleeve, or two or more heating elements may be laid adjacent each other, or directly on top of each other. Adjacent lengths of the heating element, or of the heating elements, if two or more are present, are preferably spaced at least 2, preferably 5, more preferably 10 mm apart.

The heating element may be secured to the cover in a suitable manner to ensure thermal contact therebetween. Preferably, the element (except any projecting loops) is embedded in the cover. Thus the heating element may be bonded to the surface of the cover for example by an adhesive, or by lamination of two or more polymeric sheets and/or with the heating element, so as to sandwich the element when the cover comprises a fabric, the heating element may be interlaced between the fibres of the fabric.

The heating element may consist entirely of conductive material or may have only a core or a coating or an intermediate layer or a dispersion of conductive material. An example of the third of these types of fibres is an aluminium—or other metal—coated, organic or inorganic (for example glass) fibre. The heating element preferably comprises a wire, especially preferably a metal wire. Preferably copper or copper alloy wire is used or a coated copper or copper alloy wire, for example a tin, silver or nickel plated copper or copper alloy wire. Aluminium wire may also be used. Single or stranded wire may be used. Single or stranded wire may be used. The wire preferably with an outer diameter in the range 0.2 to 4 mm.

The invention includes the use of an electrically conductive material, for example metal, as the heating element. However neither the article nor the method of the invention is specifically recommended for use in electrical screening applications. This is because the preferred spacing of the heating element lengths in the cover of the present invention provide an optical coverage less than 50%, preferably less than 25% and especially preferably less than 10%, i.e. optical coverage that is so low as to provide a surface transfer impedance significantly greater than 5 ohm/m, and hence incapable of providing effective screening. Preferably the heating element is provided with a high temperature resistant coating. It is preferred that the temperature resistant coating has a temperature rating of at least 100° C. continuous, preferably at least 150° C. continuous, and especially preferably at least 200° C. continuous. A temperature rating is a standard measure based on the maximum temperature an exposed surface may attain. The above ratings are continuous temperature ratings. Preferably the coating is also able to withstand temperatures as high as 300° C. for short periods of time. As examples of coatings that may be used there may be mentioned irradiated polyalkenes, polyamides, polyimides, polyurethanes, polyesters, silicones, Tefzel (Trade Mark) and high temperature enamels. It is especially preferred to use as the coated wire a dual-wall coated wire, especially preferably Specification 44 wire (Trade Mark) supplied by Raychem Limited, which wire has a dual wall coating comprising an inner layer of irradiated polyolefin and an outer layer of cross-linked polyvinylidene fluoride. A dual-wall coated wire advantageously has a high cut-through resistance. Where a polymeric wire coating is used this preferably has a thickness in the range 0.1 to 0.3 mm, more preferably about 0.2 mm. The high temperature resistant coating advantageously prevents short-circuiting between adjacent lengths of the heating element; and also between the projecting loops and the electrical ground, for example where the cover is being installed on a metal pipe.

The article and method according to the present invention are preferably arranged to provide a heat output greater than 0.1 Watts/cm$^2$, more preferably greater than 0.25 Watts/cm$^2$. For certain applications an upper limit is also preferred. In one preferred embodiment the article is arranged to provide a heat output in the range 0.1 to 1.5 Watts/cm$^2$, preferably in the range 0.5 to 1.0 Watts/cm$^2$. A heat output lower than the preferred value is undesirable since it is not sufficient to recover the sleeve or at least recovery is undesirably slow. An upper limit is preferred where a heat output higher than a predetermined maximum may damage the cover.

The heat output provided depends, inter alia, on the total resistance of the heating element, the spacing of adjacent lengths of the heating element, and the voltage supply. Preferably the heating element is arranged such that the desired heat output is obtained, to effect recovery of the cover using a maximum voltage of 600 volts, preferably a maximum voltage of 250 volts, more preferably a maximum voltage of 100 volts and especially preferably a maximum voltage of 50 volts. Use of such a low voltage is preferred for electrical safety.

The cover may have an adhesive or sealant coating e.g. a coating of a pressure-sensitive, hot-melt or curable adhesive or a mastic. This is useful where the cover is to be sealed to an object. The adhesive or sealant is preferably heat-activatable and is preferably selected such that the heat provided by the heating element to recover the cover also activates the adhesive or sealant. When the cover comprises a fabric, it may also comprises a polymer matrix layer, preferably one which softens when heated to accommodate recovery of a fabric to form a single composite structure. The fabric layer may be bonded to, or embedded in the polymer matrix layer.

For many applications it is not necessary precisely to control the maximum heat output. For example, where the cover is to be applied to a metal substrate having a high coefficient of thermal conductivity, for example a cast iron pipe, the pipe has such a large heat capacity that the cover will not be damaged. For more sensitive substrates it is preferred to include a thermostatic control to control the heat output. Standard thermocouples may be incorporated in the sleeves themselves or external thermostats may be used. The method of the invention preferably includes powering the heating element through a circuit including a thermostatic control adapted in a feed back loop to reduce or shut-off the power source if a predetermined temperature is exceeded in the cover. It is preferred to use a temperature control means that can precisely control the temperature of the cover. As an example one or more limiting elements may be included in the cover, which may comprise, for example, a PTC (positive temperature coefficient) composition which increases in resistance as the temperature of the cover increases, and which can be arranged to pass no current when a predetermined temperature is exceeded, but to resume passage of current when the temperature falls again.

The present cover may be provided in tubular or wrap-around form. Where a wraparound cover is used the opposed edges of the cover may be held together by any suitable closure, for example by a patch closure of a mechanical closure. It is particularly preferred to use a closure that does not require activation by heat, for example a mechanical closure. One preferred mechanical closure comprises forming, integrally or separately, upstanding flanges at the edges of the cover, which are held together by sliding a flexible metal channel over the flanges.

A wraparound article according to the invention may advantageously be conveniently manufactured in a continuous process for forming a continuous length of cover including a heating element, and simply cutting the continuous length to the dimension required, depending on the radius of the object to be covered. The fact that the projecting loops at the edges of the cover provide the electrical attachment point, in use, means that the provision of discrete electrical connection means, which would necessitate a batch process, in avoided.

The wraparound cover may be arranged to be wrapped around an object more than once. The cover may be arranged to this end by having two closure means spaced apart to define a first cover portion between them, which first cover portion can be wrapped once around an object, and secured in the wrapped configuration by the closure means. One or both of the closure means is preferably spaced from a free end of the cover to define one or more second cover portions that together can be wrapped, at least once around the object.

Preferably the cover comprises at least two closure means so as to secure more than just the outermost circumferential wrapping of the sleeve. Velcro or other low-profile closure means may be used.

For some applications, for example for covering small cross-sectioned elongate objects it may be advantageous to provide the wraparound cover pre-wrapped and secured, for convenience of handling.

The adaptability of the present cover may be used to provide a thick walled cover for high-pressure retention, the thick wall comprising a multiply wrapped sleeve. The multiple wrapping of the present cover advantageously increases the thickness of the covering around the object and hence increases the pressure that the wrapped cover can retain. Thus the cover may be used inter alia for pressurised applications the number of wrappings of the cover being selected according to the pressure.

An alternative to using a multiply wrapped cover and therefore to the method according to the present invention is to use a thicker wraparound cover of the same material which is wrapped once only around the object in the conventional way. The cover and method according to the present invention have a number of advantages over such a thicker cover. The thinner cover is easier to manufacture and more flexible than the thicker cover would be, and hence is less bulky and easier to store and transport. Also, the thinner more flexible cover is easier to install, particularly around small diameter objects. Furthermore means to effect recovery or to enhance recovery of the cover of the present invention are preferably provided as part of the cover, or between adjacent layers of the cover, making the multilayer cover much easier to recover than a similar thicker cover which can be heated only from the outside or the inside of the cover, for example by a flame from the outside, such that heat penetration through the thickness of the cover is a problem.

Preferably the closure means are arranged to secure together single layers of the wrapped cover. The result of this preferred arrangement is that the pull-out force exerted on the closure members by recovery of the cover approximates to the pull-out force that would be exerted by a single cover layer. The pull-out force exerted by the multiply wrapped cover is therefore less than the pull-out force exerted by a single thicker layer having a thickness equivalent to the total thickness of the multiply wrapped cover. Thus closure members that are less strong and typically less bulky than those required when single layer thicker covers are used, may be used with the multiply wrapped cover. Less bulky closures are generally preferred, particularly where the cover is to be used to cover transitions.

Preferably the thickness of the cover, in its non-wrapped configuration is no greater than 3 mm, preferably no greater than 2 mm. However the total thickness of the wrapped cover is at least 5 mm, for example 6 mm.

Preferably the cover is integrally formed.

The cover according to the present invention itself comprises closure means. However the cover used in the method of the present invention may or may not itself comprise closure means. Thus any suitable closure means can be used in the method of the present invention to secure the cover in the wrapped configuration. For example a patch closure may be used or a mechanical closure. Preferably the cover itself does comprise closure means, preferably two closure means and the method comprises securing the closure means together to maintain the cover in its wrapped configuration. In a preferred embodiment the cover comprises upstanding flanges which are held together by sliding a flexible, preferably a metal channel, over the flanges.

Preferably the wraparound cover according to the second aspect of the present invention is used in the method according to the first aspect of the present invention, wherein the position of the closure means is specifically defined.

In a preferred embodiment secondary closure means are provided to maintain the inner free end of a wraparound cover in a fixed position relative to the remainder of the cover. Preferably two secondary closure means are provided on the cover itself, the first of the secondary closure means being provided on a free end of the cover, and the second of the secondary closure means being provided on the inner surface of the cover, spaced from the first of the secondary closure means so that in the wrapped configuration the two secondary closure means are displaced approximately 360° to each other and can thus cooperate one with the other.

Any suitable closure may be used for the secondary closure. Preferably a low profile closure is used, for example a VELCRO (Trademark) closure or other interlocking or friction closure, or an adhesive closure.

In the cover according to the present invention at least one of the closure means is spaced from a free end of the cover to define one or more second cover portions that together can be wrapped at least once around the object. The result of this is that, when wrapped, at least two layers of cover surround the entire perimeter of at least part of the object. Preferably a single second cover portion is provided that can be wrapped at least once around the object within the first cover portion.

All or part of the cover may be recoverable. Where only part of the cover is recoverable, we prefer that at least a portion of the cover, which in the wrapped configuration forms the outer layer of the cover, is recoverable.

The cover according to the present invention is preferably heat-recoverable, and the method according to the present invention preferably comprises heating the cover to effect recovery. Any suitable heating means may be used to heat the cover. The cover may be heated for example by means of a propane torch or hot-air gun. Preferably the cover is instead or in addition heated by an electrical heating means.

Where the cover is heated by an electrical heating means this may be an integral part of the cover, for example it may be embedded in the cover or secured on a surface thereof, or the heating means may be provided separately from the cover, for example it may comprise an electrical heating layer, for example in the form of a mesh that is spirally wrapped with the cover such that the cover and the heating means alternate in layers.

The cover may be any shape. In one preferred embodiment the cover is tubular in shape. Such a tubular cover may conveniently be used to cover elongate objects such as pipes or cables. In another preferred embodiment the cover comprises a sheet that can be wrapped around to form a tubular article by retaining longitudinally opposed edges of the sheet together. Such a so-called "wraparound cover" is particularly useful for covering elongate objects, such as, pipes or cables, where no free end is available. Where a tubular or wraparound tubular cover is used the heating elements in the cover are preferably arranged to pass across the cover is a direction generally parallel to the axis of the tube.

The present cover preferably has a thickness of at least 0.4 mm. Preferably the cover has a thickness at least 1 mm, and for many applications the thickness will preferably be in the range 1 to 2 mm. Where an adhesive or sealant coating is used this preferably has a thickness of about one quarter of the thickness of the cover. For some applications, however, it may be preferred to use a cover having a thickness of at least 10 mm, more preferably at least 15 mm, especially at least 20 mm. For those applications, inter alia, it is preferred to superimpose two or more heating elements, one on top of the other, across the thickness of the cover, in order to achieve uniform heating through the thickness of the cover. Each heating element extends generally parallel to the surface and is preferably spaced from the adjacent heating element so as to prevent a short circuit.

Embodiments of covers according to the present invention will now be described, by way of example, with reference to the accompanying schematic drawings, wherein:

BRIEF DESCRIPTION OF DRAWING

Referring to the drawings, FIG. 1 shows a cover 2 comprising two recoverable sheets 3 of irradiated and stretched, polyethylene that have been press laminated together to sandwich between them a resistance heating wire 4. The resistance heating wire 4 comprises stranded tin plated copper wires covered by a dual wall temperature resistant coating (not shown) comprising an inner layer of highly cross-linked polyolefin and an outer layer of polyvinylidene fluoride. The coating has a temperature rating of 150° C. continuous. Each sheet 2 is 1.5 mm thick and has been stretched so that it shrinks in the direction indicated by arrows A. The wire 4 extends generally parallel to the cover surface along a serpentine path, passing back and forth across the cover such that each length of the wire extends in a direction perpendicular to the direction A of shrinkage of the sheets 2. Each return loop 6 of the wire 4 projects beyond the edges 8 of the sheets 2. One cover 2 is coated with a layer of mastic 9.

FIG. 2 shows an alternative embodiment in which a heat recoverable fabric is used. The fabric 10 comprises stretched recoverable high density polyethylene filaments 12 in the warp and glass fibre yarn 14 in the weft. The resistance heating wire 4, which is identical to that described with reference to FIG. 1 has been interlaced with the fibres in the weft of the fabric. This can conveniently be achieved using a standard double weft loom. The fabric is then irradiated with 1.5 MeV to a dose of 15 MRads to give the warp fibres a gel content of 37.3% (refluxing in xylene). The fabric is then extrusion laminated with low density polyethylene at a melt temperature of 260° C. between a cooled metal roller and a rubber faced roller. The polyethylene has a thickness of 0.3 mm on one side of the fabric and the same thickness on the other side and, after lamination, the composite is irradiated with high energy electrons to a further dose of 4 Mrads. During or after lamination the fabric is coated with a layer of a mastic (not shown). The low density polyethylene used has a melt flow index of 3.0, a number average molecular weight Mn of 14,800 and a weight average molecular weight Mw of 114,800.

Figure 1:
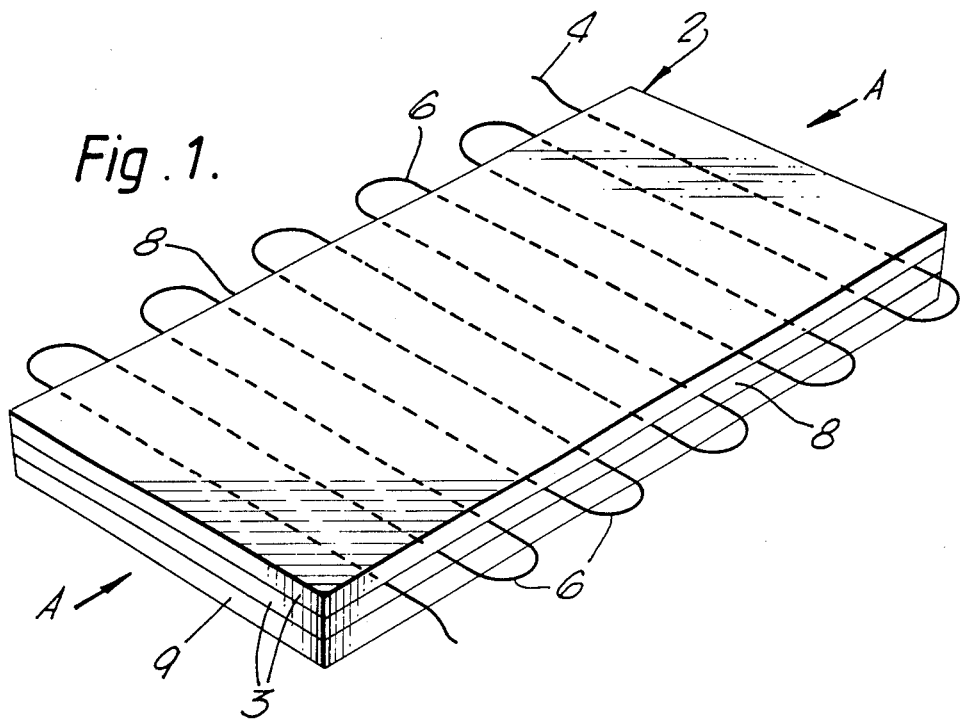
FIG. 1 is a perspective view of a first embodiment of cover according to the present invention.

Recovery is provided by the stretched high density polyethylene fibres 12 and hence is in the direction of those fibres, that is in the warp direction. Alternatively two sheets of fabric may be used and the resistance wire laminated between them in the manner described with reference to FIG. 1.

Figure 2:
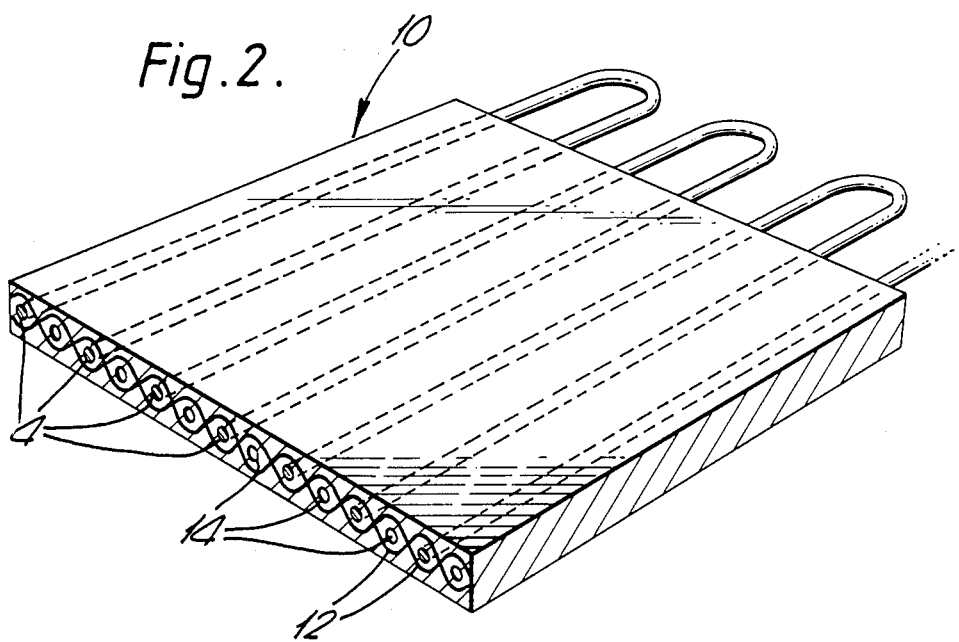
FIG. 2 is a sectioned perspective view of part of a second embodiment of cover according to the present invention.
Figure 3:
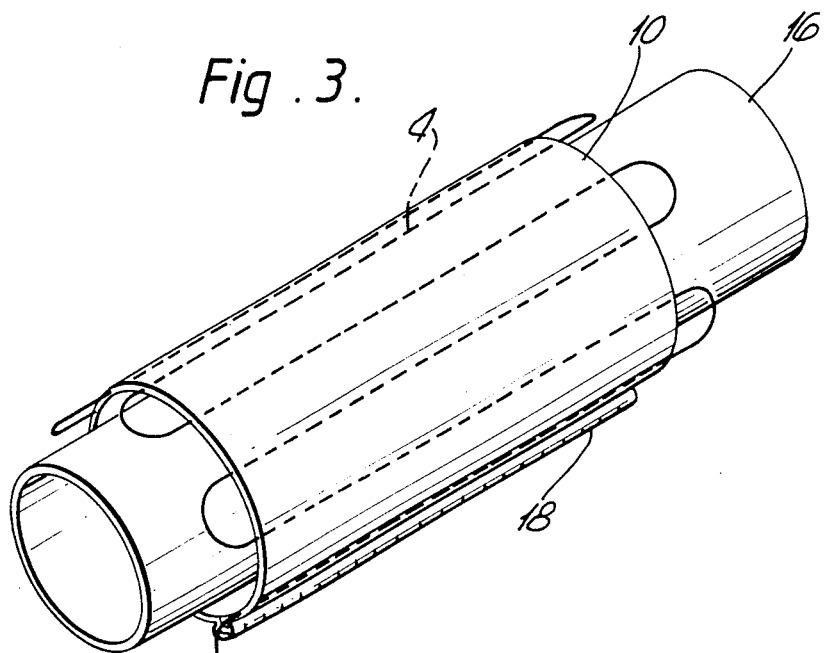
FIGS. 3 and 4 are perspective views of the cover of FIG. 2, before and after recovery respectively.
Figure 4:
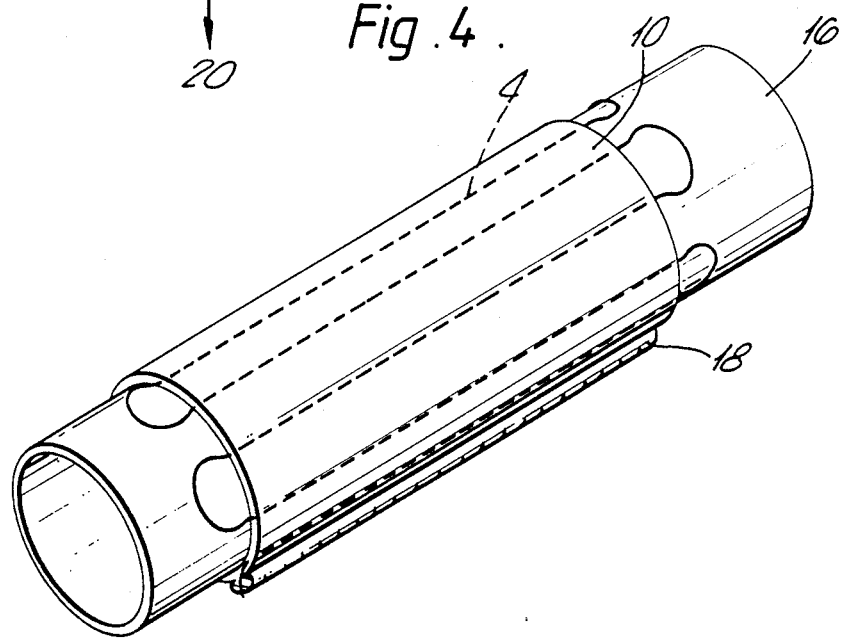

FIGS. 3 and 4 show the cover 10 of FIG. 2 being installed on a pipe before and after recovery respectively. The cover 2 of FIG. 1 could be used instead.

Referring to FIG. 3 the cover 10 is wrapped around the pipe 16 such that the direction of recovery of the cover 10 extends around the circumference of the pipe 16, and the wires 4 extend along the axis of the pipe. Longitudinal edges of the cover are secured together by a rail and channel closure 18 to retain the cover in the wrapped configuration. Other types of closure, for example other mechanical closures or an adhesive coated patch closure may also be used. The cover is a loose fit on the pipe 16 in its unrecovered state. A free end of one of the projecting loops 6 of the wire 4 is connected to an electric power supply 20.

Electricity is supplied to the wire 4 from the power supply 18 which heats the cover 10 by a resistance heating effect. The heating causes the fabric 10 to shrink along the warp direction. This causes adjacent lengths of the wire to move towards each other, and also causes the projecting loops of the wire to mushroom at their ends to accommodate the shrinkage of the cover. The cover, including the edges thereof, recovers into close conformity with the pipe 16, and a recovery ratio of 3:1 is achieved. Heating also causes the mastic to melt and flow to provide an environmental seal between the pipe and the cover.

Figure 5:
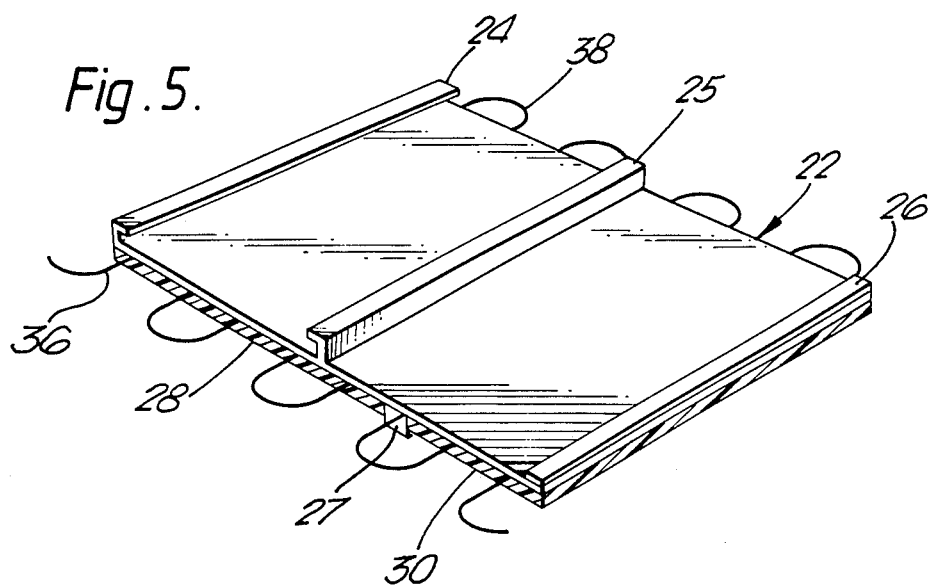
FIG. 5 is a sectioned perspective view of a third embodiment of cover according to the invention.

FIG. 5 of the drawings shows a rectangular cover 22 made from heat-recoverable cross-linked polyethylene that is recoverable in the direction of the length of the cover and that is arranged to be wrapped around an object at least twice. The cover is to be used to cover a 100 mm diameter pipe. The cover is 24 mm thick, 400 mm wide and 950 mm long. The length of the cover is selected to allow the cover to be loosely wrapped twice around the pipe, to allow for recovery by shrinkage of the cover. The cover is provided with two closure means in the form of two upstanding rails 24, 25 running parallel to the width of the cover, on the surface of the cover which will be the outer surface in the wrapped configuration. The rails 24,25 are intended to be joined in the wrapped configuration by a flexible metal channel (not shown). The rails 24,25 are spaced 475 mm apart. A first rail 24 is positioned at a first edge of the cover and the other rail 25 is spaced 475 mm from the first rail 24 and hence an equal distance from the opposite edge of the cover. The cover is provided with secondary closure means in the form of cooperating VELCRO (trademark) strips 26,27 running parallel to the rails 24,25. The first strip 26 is positioned at the opposite edge to the first rail 24, on the same surface of the cover as the rails, and the second strip 27 is positioned on the opposite surface of the cover, which will be inner surface in the wrapped configuration. The second strip 27 is spaced from the first strip 26. The inner surface of the cover is coated with an adhesive. A first hot melt adhesive 28 is provided between a first rail 24 and the secondary closure strip 27 and the second adhesive 30 is provided over the remainder of the inner surface.

The cover 22 is provided with a heating element 36, of resistance heating wire, embedded within the cover, and arranged to extend generally parallel to the surface of the cover along a serpentine path passing back and forth across the cover such that each length of the wire extends generally parallel to the width of the cover. Each return loop portion 38 of the wire projects beyond the edges of the cover.

Figure 6:
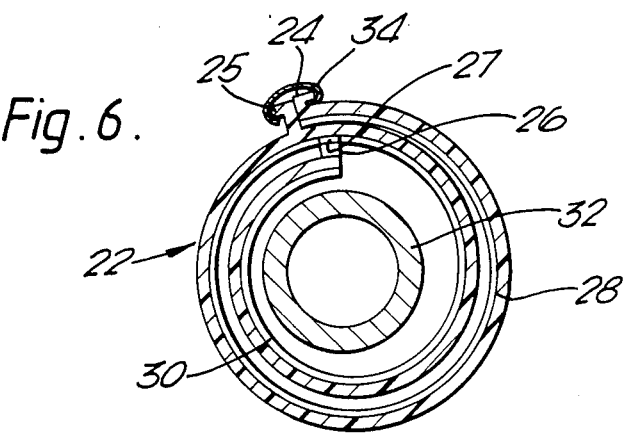
FIG. 6 is a cross-section through the cover of FIG. 5, wrapped around a medium pressure gas pipe before recovery of the cover.

FIG. 6 shows the cover 22 of FIG. 5 positioned around a pipe 32. The cover 22 has been loosely wrapped, the rails 24,25 secured together by a flexible stainless steel channel 34 and the closure strips 26,27 secured together. The hot melt adhesive 28 therefore lies between the overlapping layers of the wrapped cover 22, and the second adhesive 30 lies between the inner layer of the wrapped cover 22 and the pipe 32. During wrapping, the secondary closure strips 26 27 are first secured together and then the outer layers of the cover 22 are wrapped. The secondary closure means thus conveniently holds the cover in position during the multiple wrapping operation.

Figure 7:
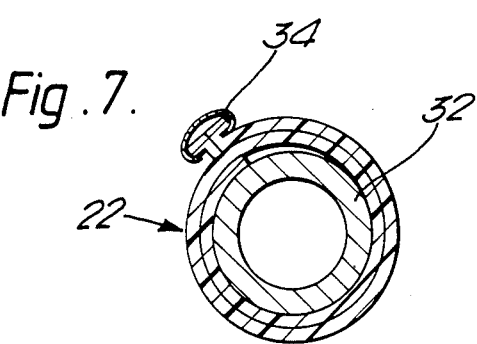
FIG. 7 is a cross-section of the cover and pipe of FIG. 6 after recovery of the cover.

FIG. 7 shows the arrangement of FIG. 6 after recovery. The cover 22 has shrunk into conformity with the pipe 32 and the multiply wrapped layers of the cover 22 have shrunk into close conformity with each other. Adhesive layer 28 has melted and flowed to bond the overlapping cover layers to each other, and the adhesive layer 30 has melted and flowed to bond the inner layer of the cover to the pipe 22. Thus in the final recovered article a covering approximately 4 mm thick is provided, the thickness of the flowed adhesive being negligible.

We claim:

1. A heat-recoverable cover comprising a sheet of polymeric material and an elongate electrical resistance heating element which is in thermal contact with the cover and which is arranged to pass back and forth in a direction generally parallel to the surface of the cover in a serpentine path, the cover having a first closure means positioned toward one end of the sheet and a second closure means spaced apart from the first closure means to define a first cover portion between them, which first cover portion can be wrapped once around an object to be covered and secured in the wrapped configuration by the first and second closure means, the second closure means being spaced from the end of the cover opposite the first closure means to define a second cover portion that can be wrapped at least once around the object inwardly of the first cover portion.

2. A cover according to claim 1, wherein the heating element is bonded to the polymeric material of the cover.

3. A cover according to claim 1, wherein the heating element is embedded in the polymeric material.

4. A heat-recoverable cover comprising a sheet of fabric which has recoverable cross-linked fibers arranged in its warp or its weft so that it is recoverable in substantially one direction, and an elongate electrical resistance heating element which is in thermal contact with the cover and which is arranged to pass back and forth in a direction generally parallel to the surface of the cover in a serpentine path, the cover having a first closure means positioned toward one end of the sheet and a second closure means spaced apart from the first closure means to define a first cover portion between them, which first cover portion can be wrapped once around an object to be covered and secured in the wrapped configuration by the first and second closure means, the second closure means being spaced from the end of the cover opposite the first closure means to define a second cover portion that can be wrapped at least once around the object inwardly of the first cover portion.

5. A cover according to claim 1 or claim 4, wherein at least one return loop portion formed by the heating element projects beyond an edge of the cover.

6. A cover according to claim 5, wherein at least the or each projecting return loop portion of the heating element is provided with a temperature resistant coating.

7. A cover according to claim 1 or claim 4, wherein the cover is arranged to recover with a recovery ratio of at least 2:1.

8. A cover according to claim 4, wherein the heating element is bonded to the fabric of the cover.

9. A cover according to claim 5, wherein the connecting return loop portion between any two adjacent lengths of the heating element, projects beyond the edge of the cover a distance which is at least one quarter of the distance of the spacing between the said two lengths of the heating element.

10. A cover according to claim 9, wherein the heating element passes back and forth substantially perpendicular to the said single direction.

11. A cover according to claim 5, wherein all the return loop portions project beyond the edges of the cover.

12. A cover according to claim 1 or claim 4, wherein the cover is recoverable in substantially a single direction, and wherein the heating element passes back and forth across the said single direction.

13. A cover according to claim 1 or claim 4, wherein electrically conductive closure members are provided which can be secured together to maintain the cover in a wraparound configuration, and through which the heating element can be powered.

14. A cover as claimed in claim 1 or claim 4, wherein the heating element is arranged as at least two heater modules which are arranged to be powered in turn by means of a switching device.

15. A cover according to claim 4, wherein the heating element is interlaced between the fibers of the fabric.

16. A cover according to claim 4, wherein the recovery of the fabric is highest in the direction of recovery of the recoverable fibers.

17. A cover according to claim 1 or claim 4, coated on a major surface thereof with an adhesive or sealant.

18. A cover according to claim 1 or claim 4, wherein the heating element is a metal wire.

* * * * *